(12) United States Patent
Lee

(10) Patent No.: US 8,189,727 B2
(45) Date of Patent: May 29, 2012

(54) DIFFERENTIAL TRANSMITTER AND AUTO-ADJUSTMENT METHOD OF DATA STROBE THEREOF

(75) Inventor: An-Hsu Lee, Hsinchu (TW)

(73) Assignee: Novatek Microelectronics Corp., Hsinchu (TW)

( * ) Notice: Subject to any disclaimer, the term of this patent is extended or adjusted under 35 U.S.C. 154(b) by 833 days.

(21) Appl. No.: 12/235,547

(22) Filed: Sep. 22, 2008

(65) Prior Publication Data

US 2009/0289675 A1    Nov. 26, 2009

(30) Foreign Application Priority Data

May 26, 2008    (TW) ................................ 97119423 A

(51) Int. Cl.
*H04L 25/00*    (2006.01)
(52) U.S. Cl. ........ 375/371; 375/354; 375/355; 375/360; 375/376; 327/141; 327/147; 327/156; 327/158; 455/260; 455/502; 455/516; 370/503; 714/707
(58) Field of Classification Search .................. 375/354, 375/355, 360, 371, 376; 370/503; 455/502, 455/260, 516; 327/141, 147, 156, 158; 714/707
See application file for complete search history.

(56) References Cited

U.S. PATENT DOCUMENTS 5,666,387 A * 9/1997 Tamamura et al. ............ 375/371
5,692,166 A * 11/1997 Milhizer et al. .............. 713/400
5,742,188 A * 4/1998 Jiang et al. ...................... 327/99
6,741,668 B1 * 5/2004 Nakamura ..................... 375/376
6,828,865 B2 * 12/2004 Yamane et al. ................. 331/25

FOREIGN PATENT DOCUMENTS

| CN | 1188346 | 7/1998 |
| TW | 538363 | 6/2003 |
| TW | I243297 | 11/2005 |

OTHER PUBLICATIONS

"First Office Action of China Counterpart Application", issued on Apr. 2, 2011, p. 1-p. 5.
"Office Action of Taiwan Counterpart Application", issued on Nov. 8, 2011, p. 1-p. 4.

* cited by examiner

*Primary Examiner* — Leon Flores
(74) *Attorney, Agent, or Firm* — Jianq Chyun IP Office

(57) ABSTRACT

A differential transmitter and an auto-adjustment method of data strobe thereof are provided. The differential transmitter includes a phase-detecting unit, a switching unit, a rising edge strobe unit, and a falling edge strobe unit. The phase-detecting unit detects a phase relation between a clock signal and a data signal to outputs a detection result. The rising edge strobe unit latches the data signal at a rising edge of the clock signal, and converts a latching result to a first differential output signal. The falling-edge-strobe unit latches the data signal at a falling edge of the clock signal, and converts a latching result to a second differential output signal. The switching unit determines whether to switch the clock signal and data signal to the rising edge strobe unit or to the falling edge strobe unit according to the detection result.

11 Claims, 4 Drawing Sheets

US 8,189,727 B2

DIFFERENTIAL TRANSMITTER AND AUTO-ADJUSTMENT METHOD OF DATA STROBE THEREOF

CROSS-REFERENCE TO RELATED APPLICATION

This application claims the priority benefit of Taiwan application serial no. 97119423, filed on May 26, 2008. The entirety of the above-mentioned patent application is hereby incorporated by reference herein and made a part of specification.

BACKGROUND OF THE INVENTION

1. Field of the Invention

The present invention relates to a data transmitter. More particularly, the present invention relates to a differential transmitter and an auto-adjustment method of data strobe thereof.

2. Description of Related Art

A differential transmitter can convert an input signal into a differential signal, and transmit the differential signal to a next stage (receiver). Taking a low voltage differential signal (referred to as LVDS hereinafter) as an example, all present LVDS transmitters have two methods for input data strobe, one is to latch an input data signal Din at a rising edge of a clock signal CLK (as shown in FIG. 1A), the other is to latch the input data signal Din at a falling edge of the clock signal CLK (as shown in FIG. 1B).

The conventional LVDS transmitter has a input mode control terminal RFB for determining whether the input data signal Din is latched at the rising edge (FIG. 1A) or at the falling edge (FIG. 1B) of the clock signal CLK. A user (system designer) has to set a correct input data strobe method for the LVDS transmitter via the input mode control terminal RFB of the LVDS transmitter.

FIG. 2 is a block diagram illustrating a conventional LVDS transmitter 200. By pull-up or pull-down the input mode control terminal RFB of the transmitter 200 via an external circuit, the user (system designer) may correctly set the input data strobe method for the transmitter 200. The conventional LVDS transmitter 200 has a multiplexer 210. Under control of the input mode control terminal RFB, the multiplexer 210 determines to switch the clock signal CLK and the data signal Din to a rising edge strobe unit 220 or switch the clock signal CLK and the data signal Din to a falling edge strobe unit 230. If the multiplexer 210 switches the clock signal CLK and the data signal Din to the rising edge strobe unit 220, the rising edge strobe unit 220 then latches the data signal Din at the rising edge of the clock signal CLK, and converts a latching result thereof to be a first differential output signal. If the multiplexer 210 switches the clock signal CLK and the data signal Din to the falling edge strobe unit 230, the falling edge strobe unit 230 then latches the data signal Din at the falling edge of the clock signal CLK, and converts a latching result thereof to be a second differential output signal.

When the input mode control terminal RFB of the transmitter 200 is pulled up via the external circuit, the multiplexer 210 switches the clock signal CLK and the data signal Din to the rising edge strobe unit 220, so that the input data signal Din is latched at the rising edge of the clock signal CLK. When the input mode control terminal RFB is pulled down, the multiplexer 210 switches the clock signal CLK and the data signal Din to the falling edge strobe unit 230, so that the input data signal Din is latched at the falling edge of the clock signal CLK.

Therefore, the user (system designer) has to know in advance whether or not the input data signal Din belongs to a type shown in FIG. 1A or belonged to a type shown in FIG. 1B, so as to pull up or pull down the input mode control terminal RFB. However, errors of data strobe occurred due to improper setting by the user (system designer) cannot be avoided.

SUMMARY OF THE INVENTION

The present invention is directed to a differential transmitter, which may automatically adjust an input data strobe method.

The present invention is directed to an auto-adjustment method of data strobe, by which a differential transmitter may automatically adjust an input data strobe method.

The present invention provides a differential transmitter including a phase-detecting unit, a switching unit, a rising edge strobe unit, and a falling edge strobe unit. The phase-detecting unit detects a phase relation between a clock signal and a data signal to outputs a detection result. The switching unit is coupled to the phase-detecting unit for determining whether to switch the clock signal and the data signal to a first output terminal set of the switching unit, or to switch the clock signal and the data signal to a second output terminal set of the switching unit according to the detection result. The rising edge strobe unit is coupled to the first output terminal set of the switching unit for latching the data signal at a rising edge of the clock signal, and converting a latching result to a first differential output signal. The falling edge strobe unit is coupled to the second output terminal set of the switching unit for latching the data signal at a falling edge of the clock signal, and converting a latching result to a second differential output signal.

The present invention provides an auto-adjustment method of data strobe for a differential transmitter. The auto-adjustment method can be described as follows. First, a phase relation between a clock signal and a data signal is detected, so as to output a detecting result. Next, determining whether to latch the data signal at a rising edge of the clock signal or to latch the data signal at a falling edge of the clock signal according to the detection result, so as to generate a latching result; and converting the latching unit to a differential output signal.

In an embodiment of the present invention, the phase-detecting unit includes a multi-phase strobe unit and a selection unit. The multi-phase strobe unit delays one of the clock signal and the data signal to generate a plurality of phase signals, and generate a plurality of strobe data according to a phase relation between the phase signals and another one of the clock signal and the data signal. The selection unit is coupled to the multi-phase strobe unit for outputting the detection result according to logical states of the strobe data.

In an embodiment of the present invention, the multi-phase strobe unit includes a delay locked loop (DLL) and an edge detector. The DLL receives the clock signal and delays the clock signal to be the phase signals. The edge detector is coupled to the DLL for latching the data signal according to rising edge timings of the phase signals, so as to generate the strobe data.

The present invention provides an auto-adjustment method of data strobe for a differential transmitter. The auto-adjustment method can be described as follows. First, a plurality of detecting timings is defined within a cycle of a clock signal, and a first period and a second period are defined within the cycle. Next, the data signal is respectively latched corresponding to the detecting timings to generate a plurality of strobe data. Next, whether a transition of the data signal is occurred within the first period or the second period is judged by checking the strobe data, so as to obtain a detection result. Finally, whether the data signal is latched at a rising edge of the clock signal or is latched at a falling edge of the clock signal is determined according to the detection result.

In the present invention, by detecting a phase relation between the clock signal and the data signal, auto-adjustment of the input data strobe can be achieved. Since an external circuit is not required for setting an input data strobe method, errors of data strobe due to improper setting of the external circuit can be avoided.

In order to make the aforementioned and other objects, features and advantages of the present invention comprehensible, a preferred embodiment accompanied with figures is described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 3:
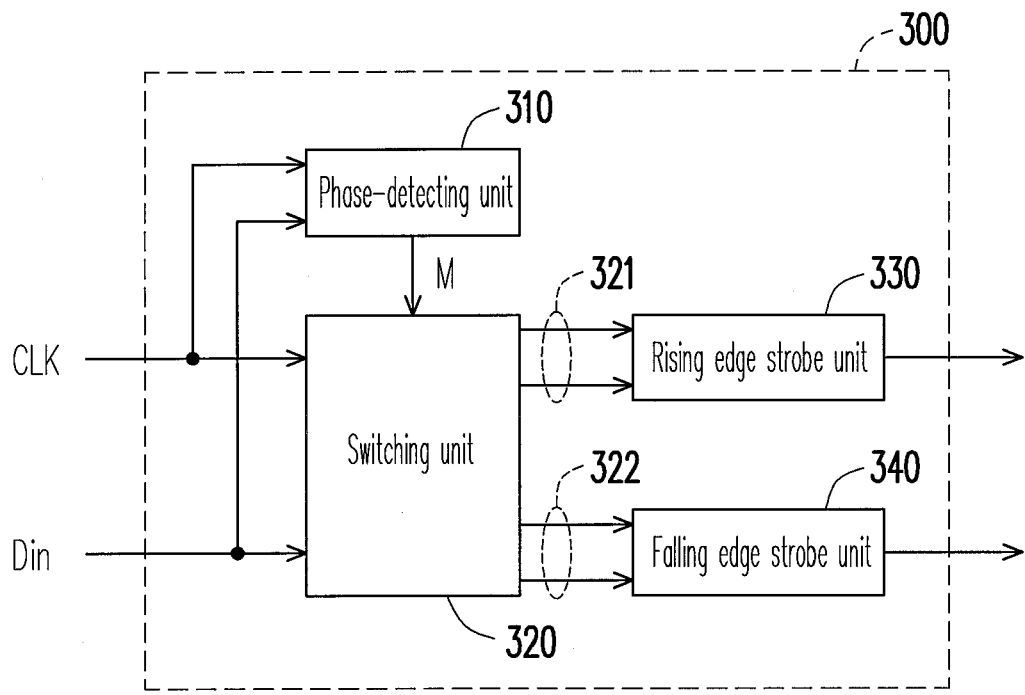
FIG. 3 is a block diagram illustrating a differential transmitter according to an embodiment of the present invention.

FIG. 3 is a block diagram illustrating a differential transmitter 300 according to an embodiment of the present invention. The differential transmitter 300 includes a phase-detecting unit 310, a switching unit 320, a rising edge strobe unit 330 and a falling edge strobe unit 340. The phase-detecting unit 310 detects a phase relation between a clock signal CLK and a data signal Din, and outputs a detection result M. The switching unit 320 is coupled to the phase-detecting unit 310. The switching unit 320 determines whether to switch the clock signal CLK and the data signal Din to a first output terminal set 321, or to switch the clock signal CLK and the data signal Din to a second output terminal set 322 according to the detection result M output from the phase-detecting unit 310.

Figure 2:
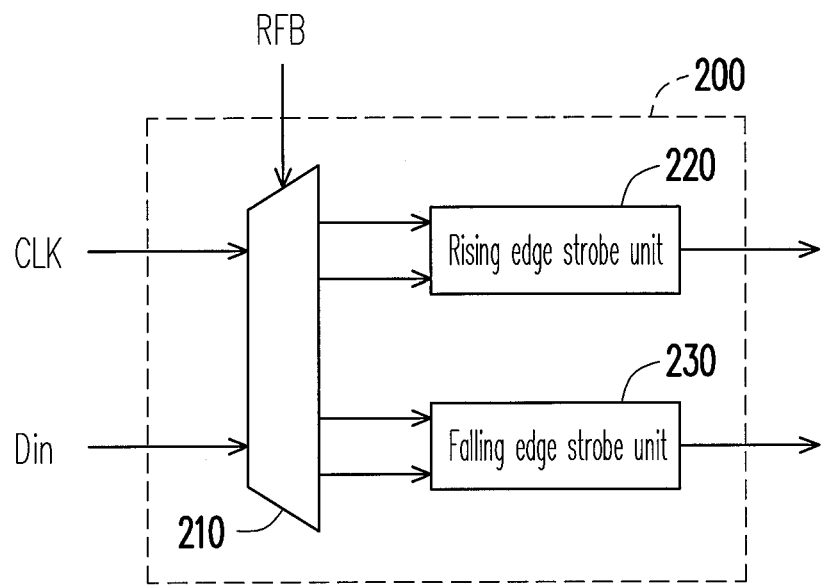
FIG. 2 is a block diagram illustrating a conventional LVDS transmitter.

The rising edge strobe unit 330 is coupled to the first output terminal set 321 of the switching unit 320 for latching the data signal Din at a rising edge of the clock signal CLK, and converting a latching result to a first differential output signal. The falling edge strobe unit 340 is coupled to the second output terminal set 322 of the switching unit 320 for latching the data signal Din at a falling edge of the clock signal CLK, and converting a latching result to a second differential output signal. The rising edge strobe unit 330 and the falling edge strobe unit 340 can be implemented arbitrarily. In the present embodiment, the rising edge strobe unit 330 and the falling edge strobe unit 340 can be implemented by the rising edge strobe unit 220 and the falling edge strobe unit 230 of FIG. 2, and detailed description thereof will not be repeated. Therefore, the first differential output signal and the second differential output signal can be low voltage differential signals.

If the switching unit 320 switches the clock signal CLK and the data signal Din to the rising edge strobe unit 330, the rising edge strobe unit 330 then latches the data signal Din at the rising edge of the clock signal CLK, and converts the latching result to be the first differential output signal. If the switching unit 320 switches the clock signal CLK and the data signal Din to the falling edge strobe unit 340, the falling edge strobe unit 340 then latches the data signal Din at the falling edge of the clock signal CLK, and converts the latching result to be the second differential output signal.

The phase-detecting unit 310 defines a plurality of detecting timings T0, T1, T2, . . . , Tn within a cycle of the clock signal CLK, and defines a first period P1 and a second period P2 within the cycle. The phase-detecting unit 310 respectively latches the data signal Din corresponding to the detecting timings T0-Tn to generate a plurality of strobe data. The phase-detecting unit 310 then judges whether a transition of the data signal Din occurs within the first period P1 or the second period P2 by checking the strobe data, so as to generate the detection result M and transmit the detection result M to the switching unit 320.

Figure 4:
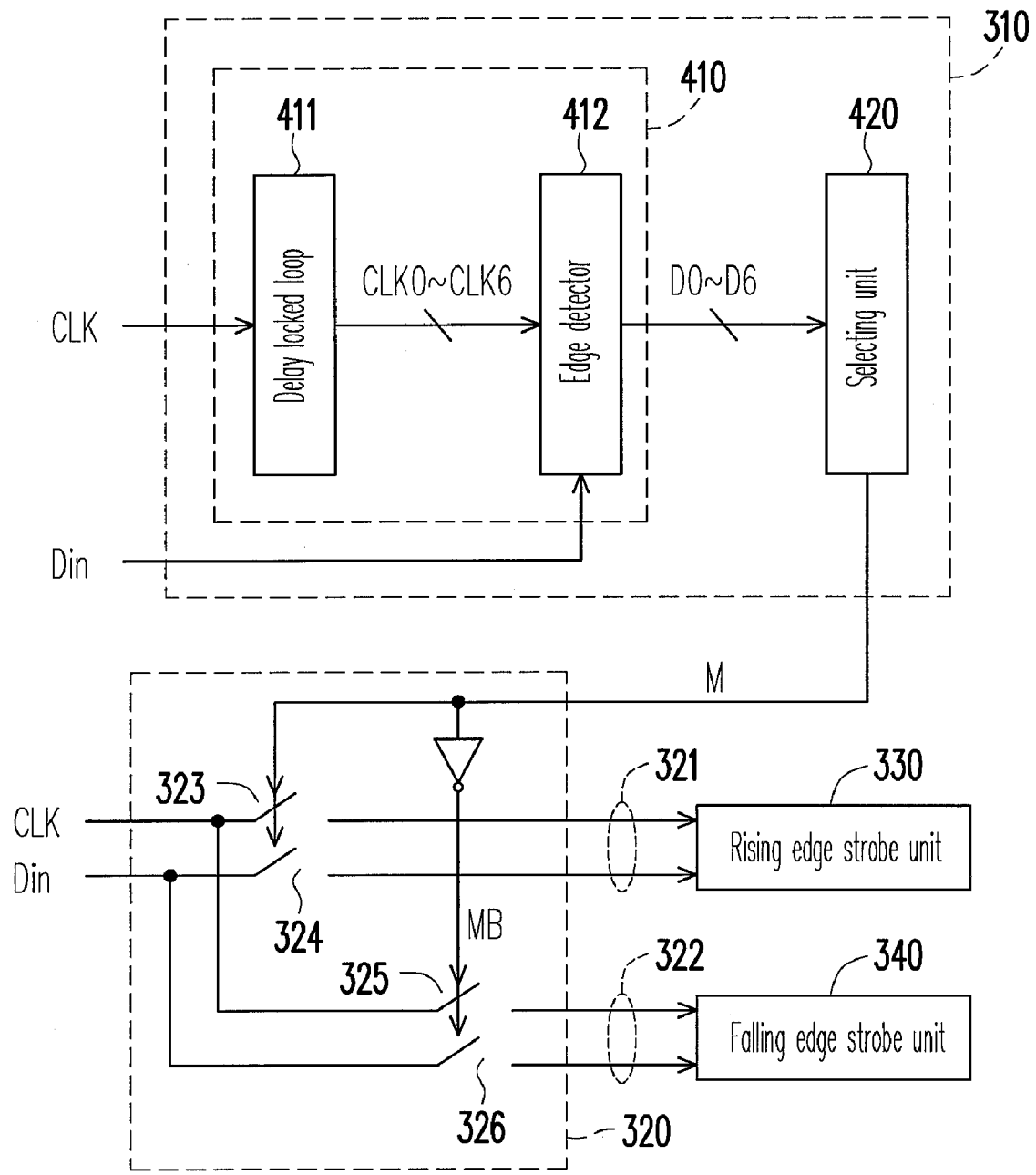
FIG. 4 is a block diagram illustrating a phase-detecting unit and a switching unit of FIG. 3.

The phase-detecting unit 310 and the switching unit 320 can be implemented arbitrarily. For example, FIG. 4 is a block diagram illustrating the phase-detecting unit 310 and the switching unit 320 of FIG. 3. The switching unit 320 includes switches 323, 324, 325 and 326. The switches 323 and 324 are controlled by the detection result M, and the switches 325 and 326 are controlled by an inverted signal MB of the detection result M. Therefore, when the switches 323 and 324 are turned off, the switches 325 and 326 transmit the clock signal CLK and the data signal Din to the falling edge strobe unit 340. Conversely, when the switches 325 and 326 are turned off, the switches 323 and 324 transmit the clock signal CLK and the data signal Din to the rising edge strobe unit 330.

Referring to FIG. 4 again, the phase-detecting unit 310 includes a multi-phase strobe unit 410 and a selection unit 420. The multi-phase strobe unit 410 delays one of the clock signal CLK and the data signal Din to generate a plurality of phase signals, and generates a plurality of strobe data according to a phase relation between the phase signals and the other of the clock signal CLK and the data signal Din. Here, assuming the multi-phase strobe unit 410 outputs seven strobe data D0, D1, . . . , D6.

In the present embodiment, the multi-phase strobe unit 410 includes a delay locked loop (DLL) 411 and an edge detector 412. The DLL 411 receives the clock signal CLK and delays the clock signal CLK to be the above-mentioned phase signals. Here, assuming the DLL 411 outputs seven phase signals CLK0, CLK1, . . . , CLK6. The edge detector 412 is coupled to the DLL 411 for latching the data signal Din according to rising edge timings of the phase signals CLK0-CLK6, so as to generate the strobe data D0-D6. It should be noted that the edge detector 412 can be implemented arbitrarily. For example, the edge detector 412 of the present embodiment may include seven data latches. The phase signals CLK0-CLK6 respectively trigger the seven data latches for latching the data signal Din. Therefore, the seven data latches can provide the strobe data D0-D6. The selection unit 420 is coupled to the multi-phase strobe unit 410 for outputting the detection result M to the switching unit 320 according to logical states of the strobe data D0-D6.

Figure 5:
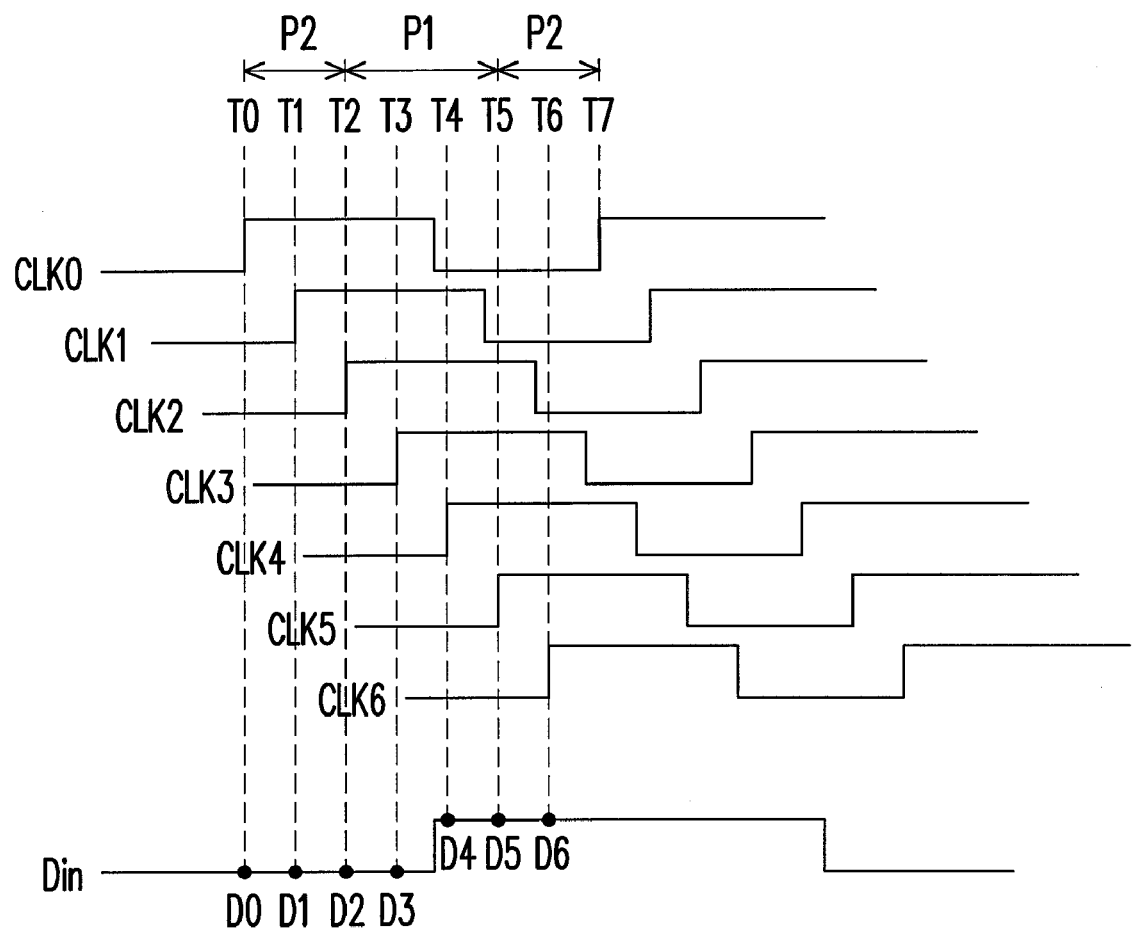
FIG. 5 is a schematic diagram illustrating a timing relation between phase signals and the strobe data of FIG. 4 according to an embodiment of the present invention.

FIG. 5 is a schematic diagram illustrating a timing relation between the phase signals CLK0-CLK6 and the strobe data D0-D6 of FIG. 4 according to an embodiment of the present invention. Referring to FIG. 4 and FIG. 5, the DLL 411 proportionally delays the input clock signal CLK to generate the seven phase signals CLK0-CLK6 (as shown in FIG. 5), wherein the phase signal CLK0 is the clock signal CLK. In the present embodiment, the detecting timings T0-T6 are defined according to the rising edges of the phase signals CLK0-CLK6. The edge detector 412 respectively latches the input data signal Din according to the rising edges of the phase signals CLK0-CLK6 (the detecting timings T0-T6). As shown in FIG. 5, values of the strobe data D0-D6 latched by the edge detector 412 at the detecting timings T0-T6 are respectively 0, 0, 0, 0, 1, 1, 1.

Figure 1A:
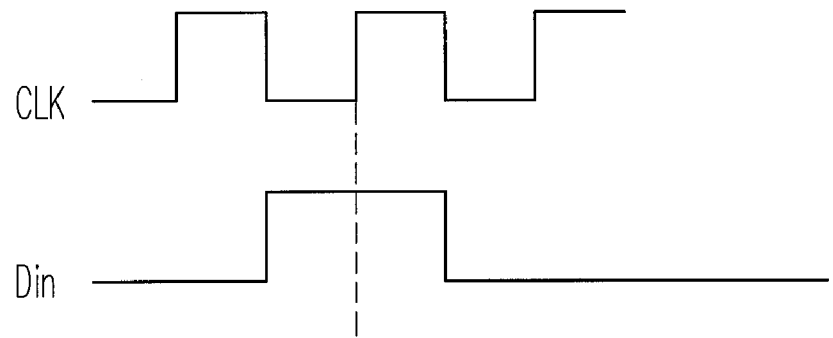
FIG. 1A is a diagram illustrating that a data signal is transmitted at a falling edge of a clock signal, and an optimal position for a differential transmitter to latch the data signal is at a rising edge of the clock signal.
Figure 1B:
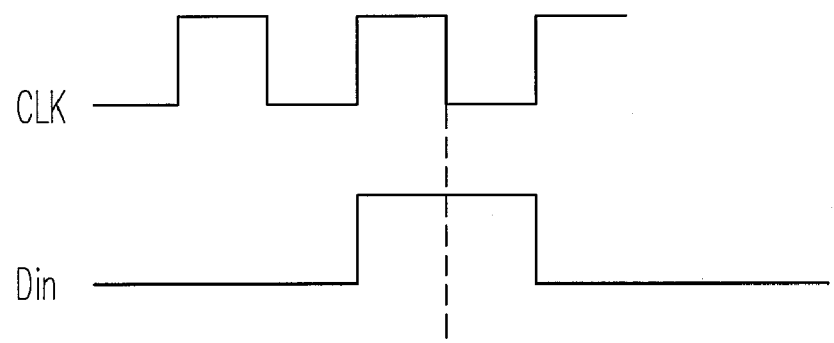
FIG. 1B is a diagram illustrating that a data signal is transmitted at a rising edge of a clock signal, and an optimal position for a differential transmitter to latch the data signal is at a falling edge of the clock signal.

If the strobe data Dn is not equal to the strobe data Dn−1, the data signal Din must have an edge, i.e. have a transition. According to FIG. 5, it is obvious that the data signal Din has a transition between the detecting timings T3 and T4. Therefore, the selection unit 420 may judge whether the data signal Din has a transition according to the values of the strobe data D0-D6 output from the edge detector 412. If the transition of the data signal Din occurs during the first period P1 (equivalent to the detecting timings T2-T5), the input data signal Din is then judged to belong to the type shown as FIG. 1A, i.e. the data signal Din is transmitted at the falling edge of the clock signal CLK. Therefore, the selection unit 420 controls the switching unit 320 according to the detection result M for transmitting the clock signal CLK and the data signal Din to the rising edge strobe unit 330. Conversely, if the transition of the data signal Din occurs during the second period P2 (equivalent to the detecting timings T0-T2, and the detecting timing T5 to the detecting timing T0 of a next cycle), the input data signal Din is then judged to belong to the type shown as FIG. 1B, i.e. the data signal Din is transmitted at the rising edge of the clock signal CLK. Therefore, the selection unit 420 controls the switching unit 320 according to the detection result M for transmitting the clock signal CLK and the data signal Din to the falling edge strobe unit 340. By such means, the input data signal Din then can be latched automatically and correctly, and latching errors of the data signal Din caused by improper setting of the external circuit can be avoided.

It should be noted that the phase relation between the clock signal CLK and the data signal Din can be obtained via any possible method, which is not limited to that of the aforementioned embodiment.

For example, though in the aforementioned embodiment the clock signal CLK is delayed to generate the phase signals CLK0, CLK1, ..., CLK6, and the data signal Din is latched according to the phase signals CLK0, CLK1, ..., CLK6, such operation is not intended to limit the present invention.

In another embodiment of the present invention, the data signal Din can also be delayed to generate a plurality of the phase signals, and the clock signal CLK is latched according to the phase signals for obtaining a plurality of the strobe data. So far, with reference of the above description, those skilled in the art can easily obtain the phase relation between the data signal Din and the clock signal CLK according to the strobe data, and detailed description and related devices thereof will not be repeated. However, such variations are considered to be within the scope of the present invention.

According to another aspect of the above embodiment, an auto-adjusting method of data strobe for a differential transmitter is concluded. The auto-adjustment method of data strobe can be described as follows. First, a plurality of the detecting timings T0-Tn is defined within a cycle of the clock signal CLK, and the first period P1 and the second period P2 are defined within the cycle, wherein n can be any integer (for example, n=6, i.e. seven detecting timings T0-T6 are defined). Next, the data signal Din is respectively latched corresponding to the detecting timings T0-Tn, for obtaining a plurality of the strobe data D0-Dn. Next, whether a transition of the data signal Din occurs within the first period P1 or the second period P2 is judged by checking the strobe data D0-Dn, so as to obtain the detection result M. Finally, whether the data signal Din is latched at a rising edge of the clock signal CLK or latched at a falling edge of the clock signal CLK is determined according to the detection result M. For example, if the transition of the data signal Din occurs during the first period P1, the clock signal CLK and the data signal Din are then transmitted to the rising edge strobe unit 330 for latching the data signal Din at the rising edge of the clock signal CLK. Conversely, if the transition of the data signal Din occurs during the second period P2, the clock signal CLK and the data signal Din are then transmitted to the falling edge strobe unit 340 for latching the data signal Din at the falling edge of the clock signal CLK.

In summary, by detecting a phase relation between the clock signal CLK and the data signal Din, auto-adjustment of the input data strobe can be achieved. Since an external circuit is not required for setting an input data strobe method, errors of data strobe due to improper setting of the external circuit can be avoided.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A differential transmitter, comprising:
    a phase-detecting unit, for detecting a phase relation between a clock signal and a data signal to output a detection result;
    a switching unit, coupled to the phase-detecting unit, for determining whether to switch the clock signal and the data signal to a first output terminal set of the switching unit, or to switch the clock signal and the data signal to a second output terminal set of the switching unit according to the detection result;
    a rising edge strobe unit, coupled to the first output terminal set of the switching unit, for latching the data signal at a rising edge of the clock signal, and converting a latching result to a first differential output signal; and
    a falling edge strobe unit, coupled to the second output terminal set of the switching unit for latching the data signal at a falling edge of the clock signal, and converting a latching result to a second differential output signal,
    wherein, the phase-detecting unit generating a plurality of phase signals by delaying the clock signal, the phase-detecting unit also generating a plurality of strobe data by latching the data signal directly according to the phase signals respectively.

2. The differential transmitter as claimed in claim 1, wherein the phase-detecting unit comprises:
    a multi-phase strobe unit, for delaying one of the clock signal and the data signal to generate the plurality of phase signals, and generate the plurality of strobe data according to a phase relation between the phase signals and the other of the clock signal and the data signal; and a selection unit, coupled to the multi-phase strobe unit for outputting the detection result according to logical states of the plurality of strobe data.

3. The differential transmitter as claimed in claim 2, wherein the multi-phase strobe unit comprises:

a delay locked loop (DLL), for receiving the clock signal and delaying the clock signal to be the phase signals; and an edge detector, coupled to the DLL for latching the data signal according to rising edge timings of the phase signals, so as to generate the strobe data.

4. The differential transmitter as claimed in claim 2, wherein the multi-phase strobe unit comprises:

a DLL, for receiving the data signal and delaying the data signal to be the phase signals; and an edge detector, coupled to the DLL for latching the clock signal according to rising edge timings of the phase signals, so as to generate the strobe data.

5. The differential transmitter as claimed in claim 1, wherein the phase-detecting unit defines a plurality of detecting timings within a cycle of the clock signal, and defines a first period and a second period within the cycle; the phase-detecting unit respectively latches the data signal corresponding to the detecting timings to generate a plurality of the strobe data; the phase-detecting unit judges whether a transition of the data signal occurs within the first period or the second period by checking the strobe data, so as to obtain the detection result.

6. The differential transmitter as claimed in claim 1, wherein the first differential output signal and the second differential output signal are low voltage differential signals.

7. An auto-adjustment method of data strobe for a differential transmitter, comprising:

detecting a phase relation between a clock signal and a data signal and outputting a detecting result, wherein the steps comprise:

delaying one of the clock signal and the data signal to generate a plurality of phase signals;

generating a plurality of strobe data by latching the data signal directly according to the phase signals; and outputting the detection result according to logical states of the strobe data;

determining whether to latch the data signal at a rising edge of the clock signal or to latch the data signal at a falling edge of the clock signal according to the detection result, so as to generate a latching result; and converting the latching unit to a differential output signal.

8. The auto-adjustment method of data strobe for a differential transmitter as claimed in claim 7, wherein step of generating the phase signals comprises delaying the clock signal to be the phase signals; and step of generating the strobe data comprises latching the data signal at rising edge timings of the phase signals, so as to generate the strobe data.

9. The auto-adjustment method of data strobe for a differential transmitter as claimed in claim 7, wherein step of generating the phase signals comprises delaying the data signal to be the phase signals; and step of generating the strobe data comprises latching the clock signal at rising edge timings of the phase signals, so as to generate the strobe data.

10. The auto-adjustment method of data strobe for a differential transmitter as claimed in claim 7, wherein steps of outputting the detection result comprise:

defining a plurality of detecting timings within a cycle of the clock signal;

defining a first period and a second period within the cycle;

respectively latching the data signal corresponding to the detecting timings for obtaining a plurality of the strobe data; and judging whether a transition of the data signal occurs within the first period or the second period by checking the strobe data, so as to obtain the detection result.

11. The auto-adjustment method of data strobe for a differential transmitter as claimed in claim 7, wherein the first differential output signal and the second differential output signal are low voltage differential signals.

* * * * *